United States Patent Office 2,736,725
Patented Feb. 28, 1956

2,736,725

COMPLEXES OF TETRACYCLINE ANTIBIOTICS AND PREPARATION OF SAME

Lawrence Ritter, Valley Cottage, N. Y., assignor to American Cyanamid Company, New York, N. Y., a corporation of Maine No Drawing. Application March 11, 1954, Serial No. 415,698

7 Claims. (Cl. 260—210)

This invention relates to complexes formed from broad spectrum antibiotics of the tetracycline group, aluminum, and alpha-hydroxy-carboxylic acids, and to methods of making these complexes, and the addition complexes of polyvalent metals thereto.

It is desirable to have several different methods of administering antibiotics. The formulations of specific antibiotics so that they will be acceptable by various routes of administration present many problems. In the past, a thoroughly satisfactory intramuscularly acceptable formulation of the tetracycline group antibiotics has not been available commercially. It is necessary that such a formulation be easily administerable, give constant and uniform blood levels, and that the formulation be non-toxic and free from harmful local effects.

The broad spectrum antibiotics of the tetracycline group include: chlortetracycline, having the formula:

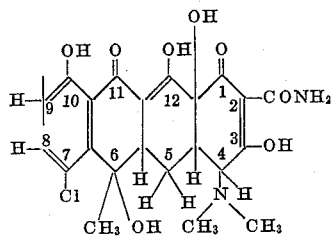

the full name of which is 7-chloro-4-dimethylamino-1,4,4a,5,5a,6,11,12a - octahydro - 3,6,10,12,12a - penta-hydroxy - 6 - methyl - 1,11 - dioxo - 2 - naphthacene-carboxamide; tetracycline, the full name of which is 4 - dimethylamino - 1,4,4a,5,5a,6,11,12a - octahydro-3,6,10,12,12a - pentahydroxy - 6 - methyl - 1,11 - dioxo-2-naphthacenecarboxamide; oxytetracycline, the full name of which is 4-dimethylamino - 1,4,4a,5,5a,6,11,12a - octa-hydro - 3,5,6,10,12,12a - hexahydroxy - 6 - methyl - 1,11-dioxo-2-naphthacenecarboxamide; and bromotetracycline, the full name of which is 7-bromo-4-dimethylamino-1,4,4a,5,5a,6,11,12a - octahydro - 3,6,10,12,12a - penta-hydroxy - 6 - methyl - 1,11 - dioxo - 2 - naphthacene-carboxamide.

These tetracycline group antibiotics are somewhat similar in many of their characteristics although the individual solubilities and physical properties differ to some extent.

It has now been found that the tetracycline group antibiotics will form complexes with aluminum and alpha-hydroxycarboxylic acids, preferably those containing only carbon, hydrogen and oxygen, such as, among others, the sugar acids. These complexes are not of a simple nature nor are they of definite composition. The complexes may contain from 1 to 8 moles of aluminum per mole of the tetracycline group antibiotic and from 1 to 24 moles of acid per mole of antibiotic. The number of moles of acid is preferably at least as great as the number of moles of aluminum. Complexes which contain a higher ratio of metal and acid are in general more soluble than the complexes having a lower ratio. As the ratio increases, the ratio of weight of antibiotic present to total weight of course decreases. These complexes additionally have the unique characteristic of forming complexes with other metals in which the other metallic ions add on to the antibiotic-aluminum-acid complex. Varying proportions of such metals may be added and form stable complexes. The complex forming metal ions include those of such metals as antimony, barium, cadmium, calcium, chromium, cobalt, copper, gold, iron, magnesium, manganese, nickel, selenium, silver strontium, tin, and zinc.

The complexes containing these other metals may only be used under circumstances in which the other metal is effectively non-toxic. For example, metals may be used in the complexes which are applied as an ointment which would be unsatisfactory for intramuscular injection.

The physical characteristics of the complexes are unique and unusual. The complexes do not have a sharp melting point but in general darken over a considerable temperature range, usually above 165° C. The complexes are more gelatinous than crystalline and gel slowly in solution showing that the complexes may form long chain polymers. Similarly, the solubilities are unusual. A chlortetracycline-aluminum-gluconic acid complex in the molar ratio of 1:1:3 was found to be comparatively soluble in water, but on standing, exhibited the anomalous property of precipitating after 18 to 24 hours when present to the extent of 100 milligrams per milliliter; after 6 hours when present at 50 milligrams per milliliter; after 4 hours when present at 10 milligrams per milliliter; and one hour at 10 milligrams per milliliter. No precipitate was formed at 1 milligram per milliliter. It would thus appear that there is a hydrolysis of the complex which is inhibited by higher concentrations. At concentrations most desirable for intramuscular injection, the metal is sufficiently stable in solution for administration, although an equilibrium mixture is not necessarily formed and the material may precipitate out on standing.

The amount of tetracycline group antibiotic is determined biologically, and measured in terms of the antibiotic hydrochloride as a standard. For example, anhydrous neutral tetracycline will be thus valued at 1080 micrograms per milligram.

In general the tetracycline complexes are more soluble than the corresponding chlortetracycline complexes. The complexes exhibit the biological activity against microorganisms which is to be anticipated from their tetracycline group antibiotic content. However, the toxicity is less than that which would have been anticipated. For example, the LD 50 for chlortetracycline hydrochloride in rats is 134 milligrams per kilogram whereas that for a chlortetracycline aluminum gluconate complex, calculated on the chlortetracycline content is 205 milligrams of chlortetracycline as the hydrochloride per kilogram. These doses are, of course, far above the normal therapeutic dosage levels.

The complexes may be administered in solution in water. When so dissolved there is a substantial reduction of the tissue irritation which would otherwise be expected in intramuscular injection of the antibiotic. The solubility permits high concentrations to be administered. The complexes may also be used in ophthalmic solutions and ointments, hydrous or anhydrous, in otic and nasal solutions, in soluble triturates, for oral administration in capsules and tablets, in ointment bases and suppositories for intravenous injection, for elixirs and other oral solutions and suspensions, in mouth washes and for other dental purposes, in oily suspensions for parenteral use, in burn dressings, for gauze impregnation, etc. The complexes are useful for administration to both humans and animals. Complexes which contain constituents which are toxic intramuscularly, as for example certain metals, may be useful topically, or otherwise, or in animals.

The exact characteristics of the complexes vary, depending upon the antibiotic and the hydroxy acid being used, and also whether or not the complex formed with aluminum is also complexed with additional metals. The molar ratios of the components and the pH causes variations in the apparent characteristics.

The complexes may be most conveniently formed in aqueous solution. The antibiotic, the aluminum ions, and the acid may be added in any form which will release the antibiotic, the aluminum ions and the acid ions, and may be added in any order. It is preferred that the aluminum react with the acid and the antibiotic be added to this reaction product. The pH of the material may be adjusted either before or after the admixture by an acid or an alkali, which acid or alkali may then form part of the complex. The complex may be used in the solution in which formed or may be recovered from the solution by diluting it out with an organic solvent in which the water is soluble, or by evaporation of the water. If the complex is formed in a high concentration it may precipitate out on standing.

The complex of chlortetracycline with aluminum chloride and a method of preparing it is disclosed and claimed in U. S. Patent 2,640,842 to Joseph F. Weidenheimer, Charles C. Reed, Lawrence Ritter and Sidney D. Upham, entitled Metal-Aureomycin Complexes. Complexes of chlortetracycline and boric acid are described in U. S. Patent 2,603,584 to Charles Pidacks and George Madison Sieger, Jr., entitled Aureomycin Complex. A reference to certain ethylenediamine salts and complexes of chlortetracycline is disclosed in application Serial No. 83,780, Weidenheimer, 650 OG 895.

Although the actual mechanism of complex formation is still obscure and the physical and chemical properties may vary, depending upon the exact complex which is formed, the complexes are of definite chemical structure although the molar ratios do not necessarily bear a small whole number relationship.

The freezing point and dialysis data indicate that a high molecular weight polymer is formed by the complex. Under some conditions, gelation may occur.

Spectrophotometric data in the ultra violet range would indicate that a true salt of the tetracycline antibiotic with the aluminum is part of the structure of the complex. While the description of the invention is not predicated thereupon, the ultra violet data and other characteristics appear to be consistent with the theory that the aluminum replaces a hydrogen ion from a hydroxyl at either the 1 or 3 position, as the hydroxyl normally shown in the 3 position (note the formula given at the beginning of the specification) is tautomeric with the same hydrogen appearing in the 1 position by a keto-enol migration. The aluminum being singly bonded to this oxygen then forms a semi-polar bond with the carbonyl oxygen of the adjacent carbamide group in the 2 position. The aluminum so bonded still has two primary valences which are attachable to the alpha hydroxy acid to form the complex or which may attach to other tetracycline nuclei giving polymer formation. A shift in the ultra violet peak of 265 millimicrons to 275 millimicrons for chlortetracycline is consistent with the alteration in the chromaphore which would be expected from this salt formation. Certain hydrogen bonding can occur which also affects the ultra violet curve.

Similarly, the hydrogen ion from a hydroxyl in the 10 position may be replaced by aluminum which then forms a semi-polar bond with the oxygen in the 11 position which again accounts for a shift in the ultra violet wherein the peak originally appearing at 368 millimicrons is shifted to 380 millimicrons. There is also the possibility of the aluminum replacing the hydrogen from the hydroxyl in the 12 position or by another keto-enol shift attaching on to either the 11 or the 1 position oxygen with semi-polar bonds to the oxygen which is then present in the 12 position. Other possibilities of a similar type are suggested because of the peculiarly conjugate characteristics of the keto and hydroxyl groups along the side of the naphthacene nucleus between the 10 and 1 positions. The labile characteristics of the hydrogens present in this portion of the molecule renders it highly probable that more than one type of group contributes to the actual characteristics of the complexes resulting.

The aluminum may be attached by replacing the hydrogens of the enol form in the 11 and 1 positions with a semi-polar bond to the resulting 12 keto group, which gives linear conjugation and subsequent shifting of the 380 millimicron peak to a still longer wave length of 390 millimicrons.

Other possible coordinate forms may exist, with, for example, the nitrogen of the dimethylamino group.

In the other tetracyclines like shifts may occur.

Although the pH of these complexes may be adjusted to anywhere within the level of from below one to more than 12, the range between 3.5 and 7 is preferred for a product designed to be used by injection.

As compared with chlortetracycline, for example, the aluminum gluconate complex of chlortetracycline shows a marked reduction in tissue irritation; in water at a pH of between 7 and 8, a solubility of greater than 150 milligrams per milliliter of contained chlortetracycline, as the hydrochloride, as compared with 10 milligrams per milliliter for chlortetracycline hydrochloride, and in the same aqueous solution a half life of over 7 weeks as compared with 5 hours for chlortetracycline hydrochloride adjusted to a pH of 7 to 8; the material is practically tasteless as compared with the very bitter taste of chlortetracycline; the complex darkens very slowly as compared with the rapid darkening of chlortetracycline hydrochloride and the material is somewhat less toxic than the chlortetracycline hydrochloride, which toxicity is very low.

Among the acids which are useful in the formation of these complexes are the alpha-hydroxy acids such as the sugar acids and including citric acid, gluconic acid, glycollic acid, lactic acid, lactobionic acid, malic acid and tartaric acid. Acids containing only the elements carbon, hydrogen and oxygen are particularly useful.

The aluminum may be added as an alkoxide. Aluminum isopropoxide and aluminum ethoxide are particularly convenient. The aryloxides or salts of aluminum with polyhydric alcohols may be used. Other forms of aluminum such as aluminum metal, aluminum citrate, aluminum nitrate, aluminum tartrate, aluminum formate, aluminum hydroxide, aluminum chloride, aluminum sulfate and potassium aluminum sulfate may be used.

The antibiotic may be added as the free base, the hydrochloride, the hydrobromide, the nitrate, the sulfate, an amine salt, or as a sodium salt or other alkali salt, or the calcium or other alkaline earth metal salt.

The complexes may be used at the pH of formation or may be adjusted during their formation or after their formation with an alkali such as sodium hydroxide or other alkali hydroxide or an alkaline earth hydroxide such as calcium hydroxide or a nitrogen base such as triethylamine, triethanolamine, piperazine, morpholine, diethanolamine and choline. Effectively any form of aluminum which is ionizable and any form of tetracycline antibiotic which gives the ionizable tetracycline antibiotic may be used in preparing the present complexes.

The formation of the complex, as is frequent in complex formation, is a rather slow process and may require from a few minutes to several hours, depending upon conditions.

Specific examples of this invention are:

EXAMPLE 1

*Chlortetracycline aluminum gluconate (1:1:3)*

4.1 grams of aluminum isopropoxide and 10.7 grams of glucono delta lactone (the anhydride of gluconic acid which forms the free acid on solution in water) were heated with stirring in 30 milliliters of water on a steam bath until a clear solution resulted. The solution was diluted to 50 milliliters with water and filtered, thereby forming a solution of normal (1:3) aluminum gluconate. To 12.5 milliliters of this solution were added 2.5 grams of chlortetracycline hydrochloride. After stirring for 10 minutes a clear solution was obtained having a pH of 2.5. After stirring for an additional 20 minutes the pH of the solution was raised to 7.0 with 10% sodium hydroxide solution. No precipitation occurred. The solution was poured with stirring into 100 milliliters of isopropanol. A light yellow amorphous precipitate formed. The precipitate was collected, washed with alcohol, and dried, giving a dry powder. 6.0 grams of chlortetracycline aluminum gluconate, a complex, was formed. The complex gives a negative ferric chloride test initially which slowly becomes positive after standing from 2 to 3 minutes. The complex on heating slowly darkens from a dark yellow between 165 and 200° C. to an orange between 200 and 235° C. and becomes dark brown above 235° C. It does not melt below 250° C. The dry powder is stable, within analytical error, for at least one week at 56° C.; for at least five weeks at 42° C. and loses less than 10% of its potency in nine hours at 110° C.

The spectrophotometric curve differs significantly from that of chlortetracycline itself in that the 368 millimicron peak is shifted to 390 millimicrons and the density from .212 to .300.

In aqueous solution at the end of six days at a pH of 7 to 8, between 50 and 55% of the original activity remains and at a pH of 6 approximately 60% remains. For comparison a chlortetracycline hydrochloride-sodium glycinate solution such as is used for intravenous injection at a pH of 8.2 has only about 12% of its activity remaining after 24 hours at room temperature, all stabilities being at 10 milligrams per milliliter of chlortetracycline as the hydrochloride. When the complex above formed was dissolved in water at various concentrations, the fairly dilute solutions precipitate out first:

| Concentration (as chlortetracycline hydrochloride equivalent) | Stability |
| --- | --- |
| 100 mg./ml | Precipitated after 18-24 hours. |
| 50 mg./ml | Precipitated after 6 hours. |
| 25 mg./ml | Precipitated after 4 hours. |
| 10 mg./ml | Precipitated after 1 hour. |
| 1 mg./ml | No precipitation. |

EXAMPLE 2

*Chlortetracycline aluminum gluconate (1:3:4.5)*

Increasing the chlortetracycline-aluminum ratio to 1:3 gives a more soluble product, particularly at levels between 10 and 25 milligrams per milliliter.

25 grams of aluminum isopropoxide and 33 grams of glucono delta lactone were dissolved in 100 milliliters of water by stirring in a steam bath, the solution was diluted to 120 milliliters and filtered to remove traces of impurities. 90 milliliters of the thus prepared solution and 15 grams of chlortetracycline hydrochloride were stirred for 40 minutes. The solution became clear at the end of 10 minutes. The pH was raised from 3.0 to 7.0 by the addition of approximately 51 milliliters of 10% sodium hydroxide solution. (A pH in the neighborhood of neutral is preferred for injection.) The solution was slowly poured with stirring into 600 milliliters of isopropanol; and the amorphous precipitate of chlortetracycline aluminum gluconate thus formed collected, washed with ethanol and vacuum dried. The complex weighed 52 grams and assayed 219 micrograms per milligram of chlortetracycline as the hydrochloride by microbiological assay.

EXAMPLE 3

*Chlortetracycline aluminum gluconate (1:2:4)*

16.3 grams of aluminum isopropoxide and 28 grams of glucono delta lactone were heated for 10 minutes in 80 milliliters of water, diluted to 100 milliliters and the solution filtered. 50 milliliters of the solution and 10 grams of chlortetracycline hydrochloride were stirred for a half hour at room temperature. The pH of the solution was adjusted to 7.0 and the volume to 100 milliliters. The solution then containing 100 milligrams of chlortetracycline per milliliter was filtered, filled into vials, 5 milliliters per vial, and quick frozen. The water was removed by freeze-drying, giving a dry amorphous preparation that easily and quickly reconstituted on the addition of 4 milliliters of water. On reconstitution, chlortetracycline aluminum gluconate was ready for injection.

EXAMPLE 4

*Oxytetracycline aluminum gluconate (1:3:5)*

25 grams of aluminum isopropoxide and 36 grams of glucono delta lactone were dissolved by heating in 120 milliliters of water, diluted to 140 milliliters and centrifuged to remove impurities. 17.5 milliliters of this aluminum gluconate solution and 2.5 grams of oxytetracycline (neutral) were stirred at room temperature for one-half hour. The solution cleared in 10 minutes. The pH was raised from the initial 3.2 to 7.0 with 20% sodium hydroxide solution. The solution was filtered to remove trace impurities and then poured into 150 milliliters of ethanol with vigorous stirring. The amorphous precipitate which formed was collected by filtration, washed with ethanol, petroleum ether, and vacuum dried. 7.5 grams of a oxytetracycline aluminum gluconate complex resulted. A ferric chloride test was at first negative but slowly became positive after standing from two to five minutes. The complex when dissolved in water at room temperature remained in solution at concentrations of both 100 milligrams per milliliter and 10 milligrams per milliliter for at least 48 hours.

EXAMPLE 5

*Chlortetracycline aluminum gluconate (1:4:12)*

25 grams of chlortetracycline (neutral) were added to 375 milliliters of aluminum gluconate solution containing 40.8 grams of aluminum isopropoxide and 107 grams of glucono delta lactone dissolved in water by stirring the mixture at room temperature until clear; the mixture was cooled during the first few hours of mixing to keep the temperature below about 30° C. and 48 hours was allowed to insure complete solution before adding the chlortetracycline. Two hours after the addition of the chlortetracycline, the pH of the clear solution was brought from 2.8 to 5.0 with 10% sodium hydroxide, and the volume adjusted to 500 milliliters. The solution was filled into dosage unit sized vials, and quick frozen. The solution of the chlortetracycline aluminum gluconate complex was kept frozen until shortly before the time of injection.

The aluminum gluconate prepared at room temperature, which requires cooling as the formation is exothermic, gives a complex which is slightly lighter in color than the complex formed from aluminum gluconate prepared at higher temperatures.

EXAMPLE 6

*Chlortetracycline aluminum gluconate (1:4:6.6)*

A stock solution of aluminum gluconate was prepared by dissolving 720 grams of glucono delta lactone in 2500 milliliters of distilled water. The temperature was brought to 95° C. and 500 grams of aluminum isopropoxide were added over a period of 30 minutes. The solution was stirred for an additional hour and a half, diluted to 3 liters and clarified by passing through an asbestos filter.

30 grams of chlortetracycline hydrochloride were dissolved in 300 milliliters of the above aluminum gluconate solution by stirring for two and one-half hours at room temperature. The volume was adjusted to 600 milliliters and the pH was raised from 3.2 to 5.0 with 20% sodium hydroxide solution. The product was frozen and dried, yielding a pale yellow amorphous chlortetracycline aluminum gluconate complete of a molar ratio of 1:4:6.6.

As indicative of the range of proportions of this invention, water soluble chlortetracycline aluminum gluconate complexes were formed having the following molar compositions:

| | |
|---|---|
| 1:1:2 | 1:3:5 |
| 1:1:3 | 1:3:6 |
| 1:1:4 | 1:3:8 |
| 1:1:5 | 1:3:9 |
| 1:1:6 | 1:4:8 |
| 1:2:3 | 1:4:10 |
| 1:2:4 | 1:4:12 |
| 1:2:6 | 1:6:12 |
| 1:3:4 | 1:6:18 |
| 1:3:4.5 | 1:8:24 |

Obviously it is not necessary that the constituents bear a small whole number relationship as the complexes may be formed with any intermediate ratio which may be desired.

The complexes containing a higher proportion of aluminum and alpha-hydroxy acid are more stable physically, and stable for a longer time in solution, and are more heat stable than the lower ratio complexes. The color is substantially the same but may vary from a pale yellow to a yellowish orange, depending on the method of separation of the complex, such as the rate of diluting with ethanol, etc.

The complexes thus formed give a comparatively high blood level without irritation. For example, in dogs the maximum level occurs between 1 and 2 hours after intramuscular injection and gives more than 1.6 micrograms per milliliter in the blood when injected at a level of 2.5 or 5 milligrams per pound. The increased stability of the complex in solution shows that there is less loss of activity once a powder is reconstituted and less destruction in the blood stream after injection as the complex moves through the tissues. Similar results are obtained with the other tetracycline antibiotics.

EXAMPLE 7

*Chlortetracycline aluminum gluconate (1:4:4) dry mix*

4.45 grams of aluminum gluconate and 2.5 grams of chlortetracycline hydrochloride were thoroughly blended together, dry, resulting in a homogeneous light yellow powder. This powder was placed in a vial and sealed. At time for use, the powder was dissolved by adding distilled water thereto, giving a clear solution of chlortetracycline aluminum gluconate having a pH of approximately 3.5. Although a clear solution is obtained almost immediately, approximately two hours' standing are required before complete complex formation takes place. This delay causes the irritation from the injection of the material to be markedly reduced as the complex is much less irritating than its component parts.

EXAMPLE 8

*Chlortetracycline aluminum lactobionate (1:3:6)*

5.3 grams of aluminum lactobionate and 2.5 grams of chlortetracycline hydrochloride were dissolved in 25 milliliters of water by stirring for five minutes. The pH was raised to 7.0 with 20% sodium hydroxide solution, the solution clarified by filtering, and poured into 150 milliliters of ethanol. The precipitate of chlortetracycline aluminum lactobionate which formed was separated, washed with alcohol, and dried.

EXAMPLE 9

*Chlortetracycline aluminum tartrate (1:4:6)*

5.0 grams of aluminum tartrate were suspended in 35 milliliters of water. Thereto was added 2.5 grams of chlortetracycline neutral. The mixture was stirred at room temperature for one hour and the pH then raised to 7.0 with 20% sodium hydroxide solution. The clear solution was filtered to remove traces of impurities, diluted to 50 milliliters, filled with vials, frozen and dried. The thus formed chlortetracycline aluminum tartrate can be reconstituted by adding water to give a solution containing 50 milligrams of chlortetracycline as the hydrochloride per milliliter. This complex, when tested subcutaneously, moved very rapidly from the site of injection with a minimum of irritation.

EXAMPLE 10

*Tetracycline aluminum gluconate (1:1:3)*

16.3 grams of aluminum isopropoxide were added with stirring to a solution of 42.6 grams of glucono delta lactone dissolved in 125 milliliters of water. Stirring was continued for one hour in an ice bath and for 24 hours at room temperature, yielding a clear solution of aluminum gluconate. The solution was diluted to 150 milliliters and filtered to remove traces of impurities. To 18.75 milliliters of the above solution was added 20 milliliters of water and 4.8 grams of tetracycline (neutral). A clear solution resulted in about two minutes. After standing for approximately an hour at room temperature, the pH was raised from 3.2 to 5.0 with 20% sodium hydroxide solution. The solution was diluted to 100 milliliters with water, filtered filled into vials, frozen and dried. The frozen and dried tetracycline aluminum gluconate was rapidly reconstituted by the addition of water to form an injectable solution.

EXAMPLE 11

*Tetracycline aluminum gluconate (1:2:6)*

4.8 grams of tetracycline (neutral) were dissolved in 37.7 milliliters of the aluminum gluconate solution prepared in the preceding example. After standing for one hour at room temperature, the pH was adjusted to 7.0 with 20% sodium hydroxide, the solution diluted to 100 milliliters, filtered, filled into vials, frozen and dried. On reconstitution to the original volume, the solution of tetracycline aluminum gluconate contains 50 milligrams of tetracycline as the hydrochloride per milliliter.

EXAMPLE 12

*Tetracycline aluminum gluconate (1:3:5)*

2.4 grams of tetracycline hydrochloride were dissolved in 25 milliliters of an aluminum gluconate solution prepared by dissolving 3.06 grams of aluminum isopropoxide and 4.45 grams of glucono delta lactone in water. After one and one-half hours at room temperature the pH was raised from an initial 3.0 to 7 with 20% sodium hydroxide and the solution frozen and dried, yielding a light yellow tetracycline aluminum gluconate complex.

EXAMPLE 13

*Tetracycline aluminum gluconate (1:4:6.6)*

1000 grams of aluminum isopropoxide were dissolved in 5 liters of distilled water containing 1440 grams of glucono delta lactone by stirring intermittently at room temperature for 24 hours, and the volume of the solution adjusted to 7200 milliliters. Traces of insoluble material were removed by filtration. To 6 liters of the above aluminum gluconate solution were added 500 grams of tetracycline (neutral). The solution was stirred until clear and the pH adjusted to 5.0 with 20% sodium hydroxide. The bulk solution was sterile filtered, sterilely filled into vials, frozen and dried. The dry tetracycline aluminum gluconate thus obtained is a pale yellow amorphous powder and is readily and rapidly reconstituted at any desired concentration from less than 1 to more than 100 milligrams per milliliter by the addition of sterile water.

The tetracycline aluminum gluconate complex showed no undesirable side effects when administered intraperitoneally in dogs at a dosage level of 10 milligrams per kilogram, calculated as tetracycline hydrochloride, observations being conducted on the blood, urine, kidneys and liver. This is approximately 5 to 10 times the normal maximum daily intramuscular dose.

Tests in humans and animals show that the complex may be administered intramuscularly to achieve a higher blood level of tetracycline than is to be expected from the same quantity of tetracycline administered in the hydrochloride or neutral form. Further, when administered as a complex, less or negligible tissue irritation results.

EXAMPLE 14

*Tetracycline aluminum gluconate (1:4:12)*

32.6 grams of aluminum isopropoxide were dissolved in 250 milliliters of water containing 83.2 grams of glucono delta lactone. The temperature during reaction was held below 25° C. by cooling. The solution was stirred overnight at room temperature, the volume adjusted to 300 milliliters, and then clarified by passing through a filter.

10 grams of tetracycline (neutral) were dissolved in 150 milliliters of the thus prepared solution by stirring. After stirring for one hour at room temperature, the pH was raised from an initial 2.8 to 5.0 with 10% sodium hydroxide solution. The solution was sterile filtered, filled into vials, frozen and dried. The dried tetracycline aluminum gluconate complex was a pale yellow amorphous powder easily reconstituted by the addition of water.

EXAMPLE 15

*Tetracycline aluminum gluconate (1:8:24)*

2.5 grams of neutral tetracycline were dissolved in 70 milliliters of an aluminum gluconate solution prepared from 8.2 grams of aluminum isopropoxide and 21.4 grams of glucono delta lactone. The clear solution was adjusted to a pH of 5.0 with sodium hydroxide. The tetracycline aluminum gluconate was isolated as a light yellow amorphous powder by pouring this solution into 250 milliliters of anhydrous ethanol and filtering. The powder was dried in vacuo.

EXAMPLE 16

*Tetracycline aluminum citrate (1:4:8)*

15.4 grams of citric acid (anhydrous) and 8.2 grams of aluminum isopropoxide were mixed with 50 milliliters of water and allowed to react for four hours at room temperature. To this solution were added 5.0 grams of tetracycline neutral resulting in a clear solution within five minutes. The pH was adjusted from approximately 2 to 3.3 with 20% sodium hydroxide solution, diluted to 100 milliliters, and frozen. The water was evaporated leaving the tetracycline aluminum citrate complex a residual dry powder which can be reconstituted to an injectable solution by the addition of water.

EXAMPLE 17

*Tetracycline aluminum glycollate (1:4:8)*

8.2 grams of aluminum isopropoxide and 6.1 grams of glycollic acid were dissolved in 50 milliliters of distilled water by stirring overnight. 5 grams of tetracycline neutral were added, yielding a clear solution within five minutes. The pH was adjusted from an initial 3.5 to 7.0 with 20% sodium hydroxide. The volume was adjusted to 100 milliliters, the solution filled into single dose vials, and frozen. The solution of tetracycline aluminum glycollate was stored frozen until ready for use.

EXAMPLE 18

*Tetracycline aluminum lactate (1:4:12)*

11.8 grams of aluminum lactate were suspended in 60 milliliters of hot water and stirred for ½ hour. 5 grams of tetracycline neutral were added. 20% sodium hydroxide was added to a pH of 7.0, the solution diluted to 100 milliliters and frozen. The frozen solution of tetracycline aluminum lactate was stored until ready for use.

EXAMPLE 19

*Tetracycline aluminum malate (1:4:8)*

8.2 grams of aluminum isopropoxide and 10.7 grams of malic acid were dissolved in 50 milliliters of distilled water by stirring at room temperature overnight. 5 grams of tetracycline neutral were added, which gave a clear solution at a pH of approximately 2.5. When the pH was raised with 20% sodium hydroxide solution, a precipitate formed between 3.4 and 6; the solution again became clear at a pH of 7. The volume was adjusted to 100 milliliters, filtered to remove traces of impurities and the material bottled, frozen and dried. The tetracycline aluminum malate was reconstituted for injection by diluting to a volume of 50 milligrams of tetracycline as the hydrochloride per milliliter.

COMPLEXES WITH ADDITIONAL METALS

EXAMPLE 20

*Tetracycline aluminum calcium gluconate (1:2:2:6)*

1.5 grams of calcium hydroxide were suspended in 10 milliliters of water. Thereto was added 37.5 milliliters of aluminum gluconate (1:3) prepared as in Example 10 and the mixture was stirred for 20 minutes. To this clear solution was then added 4.8 grams of tetracycline (neutral), which dissolved within 5 minutes. After standing for one hour at room temperature, the solution was diluted to 96 milliliters, filtered to clarify, frozen and dried, yielding a tetracycline aluminum calcium gluconate complex. When reconstituted to the original volume, the solution had a tetracycline activity of 50 milligrams per milliliter and a pH of 4.4.

A complex having similar properties may be obtained over a wide range of proportions. Therapeutically useful injectable complexes have been formed as set forth in the above example on modifying the proportions in the following ratios of tetracycline to aluminum to calcium to gluconic acid:

| | |
|---|---|
| 1:1:1:3 | 1:2:2:9 |
| 1:1:1:6 | 1:2:3:9 |
| 1:1:2:6 | 1:2:4:10 |
| 1:1:3:6 | 1:4:1:6 |
| 1:1:1:9 | 1:4:2:6 |
| 1:1:2:9 | 1:4:3:6 |
| 1:1:3:9 | 1:4:1:10 |
| 1:1:4:9 | 1:4:2:10 |
| 1:2:1:6 | 1:4:3:10 |
| 1:2:2:6 | 1:4:4:10 |
| 1:2:1:9 | 1:4:5:12 |

EXAMPLE 21

*Tetracycline aluminum calcium gluconate (1:4:1:6.6)*

20 grams of a wet calcium tetracycline cake assaying 25% tetracycline as the hydrochloride were suspended in 70 milliliters of a solution of aluminum gluconate prepared from 8.2 grams of aluminum isopropoxide and 11.8 grams of glucono delta lactone. A clear solution with a pH of 4.2 was formed within five minutes. The solution was adjusted to a volume of 100 milliliters, filtered, filled into the vials and frozen. The tetracycline aluminum calcium gluconate was stored in a freezer until ready to be injected, at which time it was melted and administered.

EXAMPLE 22

*Tetracycline aluminum calcium gluconate (1:4:5:12)*

3.7 grams of calcium hydroxide were allowed to react overnight with 70 milliliters of aluminum gluconate solution prepared from 8.2 grams of aluminum isopropoxide and 21.4 grams of glucono delta lactone in water. 5.0 grams of neutral tetracycline were added which resulted in a clear solution within five minutes which solution had a pH of 5.05. The volume was adjusted to 100 milliliters to give a tetracycline concentration of approximately 50 milligrams per milliliter. The solution was filled into vials, frozen and dried. The thus prepared dry tetracycline aluminum calcium gluconate powder can be reconstituted by adding water for administration.

EXAMPLE 23

*Tetracycline aluminum antimony gluconate*

4.8 grams of neutral tetracycline were dissolved in 60 milliliters of aluminum gluconate solution prepared from 8.2 grams of aluminum isopropoxide and 11.8 grams of glucono delta lactone. To the clear solution were added 3.3 grams of antimony potassium tartrate. After 5 minutes, the pH was raised to 6.5 by the addition of 20% sodium hydroxide solution. The complex was isolated by pouring the solution into 500 milliliters of ethanol, separating the precipitated complex, and drying it in vacuo. The precipitated tetracycline aluminum antimony gluconate complex was light yellow in color and assayed 182 micrograms as tetracycline hydrochloride per milligram.

The above procedure was repeated using various other metallic salts, the conditions otherwise being held the same. The following examples show the results.

EXAMPLE 24

*Tetracycline aluminum cadmium gluconate*

The added salt was 1.8 grams of cadmium chloride, resulting in a light yellow tetracycline aluminum cadmium gluconate complex assaying 195 micrograms per milligram.

EXAMPLE 25

*Tetracycline aluminum chromium gluconate*

The added salt was 2.3 grams of chromous chloride hexahydrate, resulting in a greenish yellow tetracycline aluminum chromium gluconate complex assaying 168 micrograms per milligram.

EXAMPLE 26

*Tetracycline aluminum cobalt gluconate*

The added salt was 2.4 grams of cobaltous chloride hexahydrate, resulting in a deep orange-brown tetracycline aluminum cobalt gluconate complex assaying 186 micrograms per milligram.

EXAMPLE 27

*Tetracycline aluminum copper gluconate*

The added salt was 1.7 grams of cupric chloride dihydrate resulting in a green tetracycline aluminum copper gluconate complex assaying 200 micrograms per milligram.

EXAMPLE 28

*Tetracycline aluminum gold gluconate*

The added salt was 3.88 grams of auric chloride, resulting in a brownish-black tetracycline aluminum gold gluconate complex assaying about 70 micrograms per milligram.

EXAMPLE 29

*Tetracycline aluminum iron gluconate*

The added salt was 2.7 grams of ferric chloride hexahydrate, resulting in an orange-brown tetracycline aluminum iron gluconate complex assaying 199 micrograms per milligram.

EXAMPLE 30

*Tetracycline aluminum manganese gluconate*

The added salt was 2.0 grams of manganous chloride tetrahydrate, resulting in an orange tetracycline aluminum manganese gluconate complex assaying 220 micrograms per milligram.

EXAMPLE 31

*Tetracycline aluminum nickel gluconate*

The added salt was 2.4 grams of nickelous chloride hexahydrate, resulting in a light green tetracycline aluminum nickel gluconate complex assaying 200 micrograms per milligram.

EXAMPLE 32

*Tetracycline aluminum selenium gluconate*

The added salt was 1.3 grams of selenious acid, resulting in a light yellow tetracycline aluminum selenium gluconate complex assaying 207 micrograms per milligram.

EXAMPLE 33

*Tetracycline aluminum silver gluconate*

The added salt was 1.7 grams of silver nitrate. The neutralization to a pH of 6.5 was conducted with triethanolamine instead of sodium hydroxide. The precipitated tetracycline aluminum silver gluconate complex was light yellow in color and assayed 155 micrograms per milligram.

EXAMPLE 34

*Tetracycline aluminum strontium gluconate*

The added salt was 2.7 grams of strontium chloride hexahydrate, resulting in a light yellow tetracycline aluminum strontium gluconate complex assaying 180 micrograms per milligram.

EXAMPLE 35

*Tetracycline aluminum tin gluconate*

The added salt was 2.3 grams of stannous chloride dihydrate, resulting in a yellow tetracycline aluminum tin gluconate complex assaying 187 micrograms per milligram.

EXAMPLE 36

*Tetracycline aluminum zinc gluconate*

The added salt was 1.5 grams of zinc chloride, resulting in a yellow tetracycline aluminum zinc gluconate complex.

The effect of these complexes with additional metals may be shown by their inhibition on the growth of various organisms.

| Complex of tetracycline aluminum gluconate and— | Example No. | Assay, mcg./mg. | Minimal inhibitory concentration of the complex itself in micrograms per milliliter for— | | | | | |
|---|---|---|---|---|---|---|---|---|
| | | | Myco. | Sal. | Subt. | Staph. | Prot. | Sarc. |
| ---------- | 13 | 181 | 3.0 | 25 | 1.5 | 1.5 | 50 | 3.0 |
| Antimony | 23 | 182 | 6.0 | 25 | 1.5 | 3.0 | 50. | 6.0 |
| Cadmium | 24 | 195 | 6.0 | 25 | 1.5 | 3.0 | 50 | 3.0 |
| Chromium | 25 | 168 | 6.0 | 25 | 1.5 | 1.5 | 50 | 6.0 |
| Cobalt | 26 | 186 | 6.0 | 25 | 1.5 | 3.0 | 50 | 3.0 |
| Copper | 27 | 200 | 6.0 | 25 | 1.5 | 3.0 | 50 | 3.0 |
| Gold | 28 | 70 | 12.0 | 50 | 3.0 | 6.0 | >50 | 6.0 |
| Iron | 29 | 199 | 6.0 | 25 | 1.5 | 3.0 | 50 | 3.0 |
| Manganese | 30 | 220 | 3.0 | 25 | 1.5 | 3.0 | 50 | 3.0 |
| Nickel | 31 | 200 | 6.0 | 25 | 1.5 | 1.5 | 50 | 6.0 |
| Selenium | 32 | 207 | 6.0 | 25 | 1.5 | 3.0 | 50 | 6.0 |
| Silver | 33 | 155 | 6.0 | 25 | 1.5 | 1.5 | 50 | 3.0 |
| Strontium | 34 | 180 | 6.0 | 25 | 1.5 | 3.0 | 50 | 3.0 |
| Tin | 35 | 187 | 3.0 | 25 | 1.5 | 1.5 | 50 | 1.5 |

Abbreviations—
 Myco.—Mycobacterium sp. 607
 Sal.—*Salmonella pullorum*
 Subt.—*Bacillus subtilis*
 Staph.—*Staphylococcus aureus*
 Prot.—*Proteus vulgaris*
 Sarc.—*Sarcina lutea*

SOLUBILIZING AGENTS

The tetracycline group-aluminum-alpha-hydroxy acids form a series of soluble complexes; it has been found that the complexes which contain a lower proportion of aluminum and acid may be less soluble than is desired for certain applications. The stability of the solutions to precipitation can be increased by the addition of solubilizing agents. Such surface active materials as the polyoxyethylene derivatives of fatty acid esters of polyhydric alcohols and the polyoxyethylene ethers of long chain aliphatic alcohols are particularly useful.

EXAMPLE 37

*Chlortetracycline aluminum gluconate with "Tween 80" (1:1:3)*

4.2 grams of aluminum isopropoxide and 11 grams of glucono delta lactone were dissolved in 40 milliliters of water by heating the solution, diluted to 50 milliliters, and filtered. 5 grams of chlortetracycline hydrochloride and 5 grams of a polyoxyethylene derivative of sorbitan mono-laurate (sold commercially as "Tween 80") were added to 27.5 milliliters of the thus formed aluminum gluconate solution and stirred for one-half hour. The solution became clear within five minutes. The solution was adjusted to a pH of 7.0 with 10% sodium hydroxide, thus forming a stable solution of chlortetracycline aluminum gluconate. The complex remained in solution at dilutions containing 100, 50, 25, 10, and 1 milligrams per milliliter of chlortetracycline assayed as the hydrochloride. All of the solutions were still clear at the end of 24 hours' storage at room temperature.

EXAMPLE 38

*Chlortetracycline aluminum gluconate (1:1:3) and polyoxyethylene lauryl ether*

2.5 grams of chlortetracycline hydrochloride were dissolved in 12.5 milliliters of aluminum gluconate solution prepared as in the preceding example. The pH was adjusted to 7.0 with 10% sodium hydroxide. 2.5 grams of polyoxyethylene lauryl ether (about 25 ethylene residues and one lauryl alcohol residue per molecule) (sold by the Atlas Powder Company as "Brij 35") were dissolved in 10 milliliters of water and added to the solution. The thus formed solution of chlortetracycline aluminum gluconate was diluted to form concentrations of chlortetracycline as the hydrochloride of 100, 50, 25, 10, and 1 milligrams per milliliter. The polyoxyethylene lauryl ethers are resistant to hydrolysis, and accordingly solutions stabilized with them are less inclined to precipitate in the presence of a blood serum containing hydrolytic enzymes than are the polyoxyalkalene-polyhydric alcohol-fatty acid ester stabilized solutions.

The solutions stabilized by the polyoxyethylene lauryl ether was tested in horse serum at concentrations of 25 and 10 milligrams per milliliter, and found to be stable for more than 24 hours. The polyoxyethylene lauryl ether stabilized solutions are remarkably free from tissue irritation on intramuscular injection.

The stability of the stabilized solution can be shown by adding a soluble calcium salt. It is found that at a pH of 8, the most insoluble point of calcium chlortetracycline, the complex remains in clear solutions at concentrations of 100 milligrams per milliliter, whereas calcium chlortetracycline has a solubility of approximately 100 micrograms per milliliter at this same pH. Probably part of the calcium complexes with the chlortetracycline aluminum gluconate complex, but the solution remains stable.

EXAMPLE 39

*Chlortetracycline aluminum gluconate (1:1:2) with polyoxyethylene lauryl ether*

4.1 grams of aluminum isopropoxide and 7.35 grams of glucono delta lactone were dissolved in 40 milliliters of water by heating on a steam bath, the solution diluted to 50 milliliters and filtered. 5 grams of polyoxyethylene lauryl ether (Brij 35) were dissolved in 27.5 milliliters of the solution. 5.0 grams of chlortetracycline hydrochloride were added and the mixture stirred for one-half hour. The clear solution was raised to a pH of 7.0 with 10% sodium hydroxide solution. A gelatinous precipitate formed between pH 4 and 6 but redissolved on continued stirring. The solution was satisfactory for intramuscular injection or could be frozen and dried, and reconstituted when desired.

EXAMPLE 40

*Chlortetracycline aluminum gluconate (1:1:3) with polyoxyethylene lauryl ether*

0.8 gram of aluminum hydroxide and 6 grams of glucono delta lactone were boiled together in 75 milliliters of water for one-half hour until a nearly clear solution resulted. The solution was diluted to 60 milliliters, replacing part of the evaporated water, and filtered. To 30 milliliters of the clear solution were added 2.5 grams of chlortetracycline hydrochloride and 2.5 grams of polyoxyethylene lauryl ether (Brij. 35). The mixture was stirred for one-half hour and adjusted to pH 7.0 with dilute sodium hydroxide solution. The material may be used as is, or frozen and dried, and reconstituted at a later time for intramuscular injection.

EXAMPLE 41

*Chlortetracycline aluminum gluconate (1:1:3)*

8.2 grams of aluminum isopropoxide, 22 grams of glucono delta lactone, and 80 milliliters of water were heated on a steam bath until nearly clear. The solution was diluted to 100 milliliters and filtered. 55 milliliters of the thus formed solution and 10 grams of chlortetracycline hydrochloride were stirred for one-half hour. The pH was raised from 2.8 to 7.0 with sodium hydroxide solution, the solution was filtered to remove traces of impurities and then poured with stirring into 400 milliliters of isopropanol. The precipitate was separated on a filter, washed with ethanol, and dried. A yield of 22.7 grams of chlortetracycline aluminum gluconate was obtained which assayed 369 micrograms per milligram as chlortetracycline hydrochloride. This corresponds to a yield of 84% based on the chlortetracycline content.

A diluent was prepared for the above powder by diluting 10 grams of polyoxyethylene lauryl ether to 100 milliliters with water. 4 milliliters of this diluent were added to 1.35 grams of the dry chlortetracycline aluminum gluconate complex giving a clear solution with a pH of 7.0 and a concentration of 100 milligrams per milliliter of chlortetracycline as the hydrochloride. The material dissolves rapidly and the reconstituted solution when injected into dogs at a concentration of 2.5 and 5.0 milligrams per pound gave negligible tissue irritation.

EXAMPLE 42

*Chlortetracycline aluminum gluconate (1:1:3) concurrent addition*

8.2 grams of aluminum isopropoxide and 22 grams of glucono delta lactone were heated in 80 milliliters of water, and after solution, diluted to 100 milliliters volume. To 12.5 milliliters of the above solution, after clarification, were added 2.5 grams of polyoxyethylene lauryl ether and 0.7 grams of sodium hydroxide in 10 milliliters of water giving a clear solution having a pH of 11.5. This solution was added to 2.5 grams of chlortetracycline hydrochloride, giving a solution analyzing 100 milligrams per milliliter as chlortetracycline hydrochloride.

A clear solution forms in less than 5 minutes. Complete complex formation does not take place for about an hour. The solution as immediately prepared was found to be irritating to the tissue on injection, but if permitted to stand for an hour was no longer irritating. This confirms the slow formation of the complex and establishes that a true complex is being formed.

The above examples are by way of illustration only, as the various different conditions and proportions shown for one antibiotic and set of conditions may be used in any other combination within the scope of this invention.

I claim:

1. A complex of a tetracycline antibiotic selected from the group consisting of chlortetracycline, oxytetracycline, and tetracycline; aluminum; a cation selected from the group consisting of the cations of hydrogen, antimony, cadmium, calcium, chromium, cobalt, copper, gold, iron, manganese, nickel, selenium, silver, strontium, tin and zinc and a non-toxic alpha-hydroxy carboxylic acid selected from the group consisting of citric acid, gluconic acid, glycollic acid, lactic acid, lactobionic acid, malic acid and tartaric acid in the ratio of the antibiotic to aluminum to acid of not less than 1:1:1 and not greater than 1:8:24.

2. The complex chlortetracycline aluminum gluconate.

3. The complex oxytetracycline aluminum gluconate.

4. The complex tetracycline aluminum gluconate.

5. The complex chlortetracycline aluminum lactobionate.

6. The complex tetracycline aluminum calcium gluconate.

7. A process of preparing in aqueous solution a complex of a tetracycline antibiotic selected from the group consisting of chlortetracycline, oxytetracycline, and tetracycline; aluminum; a cation selected from the group consisting of the cations of hydrogen, antimony, cadmium, calcium, chromium, cobalt, copper, gold, iron, manganese, nickel, selenium, silver, strontium, tin, and zinc; and a non-toxic alpha-hydroxy carboxylic acid selected from the group consisting of citric acid gluconic acid, glycollic acid, lactic acid, lactobionic acid, malic acid and tartaric acid in the ratio of not less than 1:1:1:1 and not greater than 1:8:10:24, and the molar ratio of said acid to aluminum is greater than 1:1; comprising reacting the aluminum salt of the corresponding non-toxic alpha-hydroxy carboxylic acid, the corresponding tetracycline antibiotic selected from the group consisting of the free base and the water soluble non-toxic salts thereof, and where the cation is not hydrogen, a member of the group consisting of the water soluble non-toxic salts corresponding to said cation, and the hydroxides thereof; within the named molar ratios; thereby forming said complex.

References Cited in the file of this patent

UNITED STATES PATENTS

| | | |
|---|---|---|
| 2,516,080 | Sobin | July 18, 1950 |
| 2,640,842 | Weidenheimer et al. | June 2, 1953 |
| 2,658,078 | Blase | Nov. 3, 1953 |

FOREIGN PATENTS

| | | |
|---|---|---|
| 497,345 | Canada | Nov. 3, 1953 |
| 507,692 | Belgium | June 9, 1952 |

OTHER REFERENCES

Weidenheimer et al.: Abstract of S. N. 83,780, 650 O. G. 895, September 18, 1951.